US011261027B2

(12) United States Patent
Lipford

(10) Patent No.: US 11,261,027 B2
(45) Date of Patent: Mar. 1, 2022

(54) LINING SOCK FOR FOUNDRY MOLDING MIX CHUTE

(71) Applicant: ASK Chemicals LLC, Wilmington, DE (US)

(72) Inventor: Thomas Edward Lipford, Mogadore, OH (US)

(73) Assignee: ASK Chemicals LLC, Wilmington, DE (US)

( * ) Notice: Subject to any disclaimer, the term of this patent is extended or adjusted under 35 U.S.C. 154(b) by 0 days.

(21) Appl. No.: 16/857,481

(22) Filed: Apr. 24, 2020

(65) Prior Publication Data

US 2020/0247614 A1 Aug. 6, 2020

Related U.S. Application Data

(63) Continuation-in-part of application No. 29/611,416, filed on Jul. 21, 2017, now Pat. No. Des. 882,652.

(51) Int. Cl.
*B65G 11/16* (2006.01)

(52) U.S. Cl.
CPC .................................... *B65G 11/16* (2013.01)

(58) Field of Classification Search
CPC .......... B65G 11/16; B65G 11/14; B65G 11/18
USPC ................. 193/2 R, 25 R, 25 C, 33
See application file for complete search history.

(56) References Cited

U.S. PATENT DOCUMENTS

| | | | |
|---|---|---|---|
| 240,289 A | 4/1881 | Walbridge | |
| 3,699,732 A * | 10/1972 | Janssen | B65G 11/106 52/195 |
| 3,779,679 A * | 12/1973 | Bisinella | B22D 41/023 425/110 |
| 4,529,660 A * | 7/1985 | Heim | B32B 27/18 428/423.1 |
| 4,946,291 A * | 8/1990 | Schnaars | B65D 88/1618 383/109 |
| 5,184,706 A * | 2/1993 | Christenson | B28C 5/4251 193/10 |
| 5,193,710 A * | 3/1993 | Podd, Sr. | B65D 90/047 220/1.6 |
| 5,244,069 A * | 9/1993 | Cosgrove | B28C 5/0818 193/25 A |
| D354,602 S | 1/1995 | Goubaud | |
| 5,472,768 A | 12/1995 | Anson | |
| D365,909 S | 1/1996 | Spenceley | |
| 6,250,450 B1 * | 6/2001 | Howard | B65G 11/166 193/2 R |

(Continued)

FOREIGN PATENT DOCUMENTS

DE 19542384 C2 5/1997

*Primary Examiner* — Douglas A Hess
(74) *Attorney, Agent, or Firm* — Standley Law Group LLP

(57) ABSTRACT

A liner protects an interior surface of a chute that transfers workable foundry molding mix from a mixer to a machine for molding and hardening. The liner has an upper border portion and body portion. The upper border portion secures the liner to an upper portion of the chute. The body portion has at least one panel of a flexible material and is sized and adapted to line the interior surface of the chute. The liner also has a plurality of apertures through the upper border portion for attaching the upper border portion to the upper portion of the chute. The flexible material of the body portion is a woven fabric with polymeric fibers and, optionally, a polymeric coating.

11 Claims, 3 Drawing Sheets

(56) References Cited

U.S. PATENT DOCUMENTS

| | | | |
|---|---|---|---|
| 6,686,402 B2 | 2/2004 | Woodson | |
| 6,938,749 B1* | 9/2005 | Quigley | B65G 11/026 |
| | | | 193/2 R |
| D530,350 S | 10/2006 | Griggs et al. | |
| 7,232,023 B2* | 6/2007 | Ellis | B65G 11/166 |
| | | | 193/2 R |
| 7,967,161 B2* | 6/2011 | Townsend | B65D 90/048 |
| | | | 220/1.6 |
| 8,876,439 B2 | 11/2014 | Sheehan | |
| 8,948,910 B2 | 2/2015 | Cottard et al. | |
| 9,475,641 B1 | 10/2016 | Brandon | |
| D803,915 S | 11/2017 | Malmberg et al. | |
| D832,315 S | 10/2018 | Malmberg et al. | |
| D871,709 S | 12/2019 | Hogan et al. | |
| 10,822,161 B2* | 11/2020 | Sullinger | B65D 83/0055 |
| 2010/0232889 A1 | 9/2010 | Sheehan | |
| 2012/0281932 A1 | 11/2012 | Rugheimer | |
| 2016/0137420 A1* | 5/2016 | Kishor et al. | |

* cited by examiner

LINING SOCK FOR FOUNDRY MOLDING MIX CHUTE

CROSS-REFERENCE TO RELATED APPLICATIONS

This application is a continuation-in-part of US design patent application 29/611,416, now issued as U.S. D882,652 on 28 Apr. 2020, from which a claim of priority is made.

TECHNICAL FIELD

The present invention relates to a flexible liner for use in association with a chute for dispensing uncured or partially-cured foundry molding mix into a mold or pattern, where the curing process is completed. Such a liner is made up of an upper border region having means for affixing the liner to an interior of the chute, an intermediate region of a woven material that is adapted to line the chute with which it is used, and an outlet region.

BACKGROUND OF THE ART

The use of gaseous catalysts, and especially tertiary amines, as curing agents in the cold box process of curing phenol formaldehyde and poly-isocyanate resins is known in the art. As an example, the applicant is the owner of U.S. Pat. No. 6,686,402 to Woodson, which describes the polyurethane cold box (PUCB) process in which a large percentage of an aggregate material, such as a silica sand, is mixed with two parts of a binder system that are kept separate until the time of use. Upon being mixed, the binder mix parts begin a reaction that will form the polyurethane and the combined parts adhere to the aggregate and provide a workable foundry molding mix that is suitable to be dispensed into a core mold or pattern. Once dispensed and shaped in the core mold or pattern, a gaseous medium is blown through the shaped molding mix, hardening the foundry mix into a usable form. A typical gas used for this hardening is a tertiary amine. Sulfur dioxide or carbon dioxide are also used in other types of binder systems as the gas.

In many of the commercial applications, a mixer vessel in which the binder mix parts and the aggregate are mixed is positioned above the core machine in which the cores or patterns are formed, with a chute, between the mixer and core machine used to direct the workable foundry molding mix into the core machine. The ongoing presence of the hardening gas in the environs exposes the workable foundry mix to the hardening gas. When this occurs, the workable foundry molding mix can prematurely harden on the surfaces of the chute, etc., providing an on-going clean-up project.

It is an unmet need of the prior art to provide a flexible liner element to protect interior and exterior surface of the chute and the surroundings.

SUMMARY OF THE INVENTION

These and other unmet needs are met by a liner for protecting an interior surface of a chute for transferring the workable foundry molding mix from a mixer to a machine for molding and hardening the workable foundry molding mix, the liner comprising: an upper border portion, sized and adapted for securing the liner to an upper portion of the chute; and a body portion, having at least one panel of a flexible material, the body portion sized and adapted to line the interior surface of the chute.

In some embodiments, the upper border portion has at least one panel of a flexible material.

In some of these embodiments, the liner further comprises means for attaching the upper border portion to the upper portion of the chute, deployed on the upper border portion. In some of these embodiments, the means for attaching comprises a plurality of apertures through the upper border portion, each of the apertures positioned for passage therethrough by a one of a plurality of fasteners that attaches the chute to the mixer. In particular, the liner further comprises a plurality of reinforcing grommets, with each of the plurality of apertures provided with one of the reinforcing grommets.

In many of the embodiments, the flexible material of the body portion and, optionally, the upper border portion, is a woven fabric comprising polymeric fibers, especially a woven polymeric fabric that is further coated with a polymeric coating.

BRIEF DESCRIPTION OF THE DRAWINGS

The inventive concept will be better understood when reference is made to the appended drawings, wherein identical parts are identified with identical part numbers and wherein.

DETAILED DESCRIPTION

Figure 1:
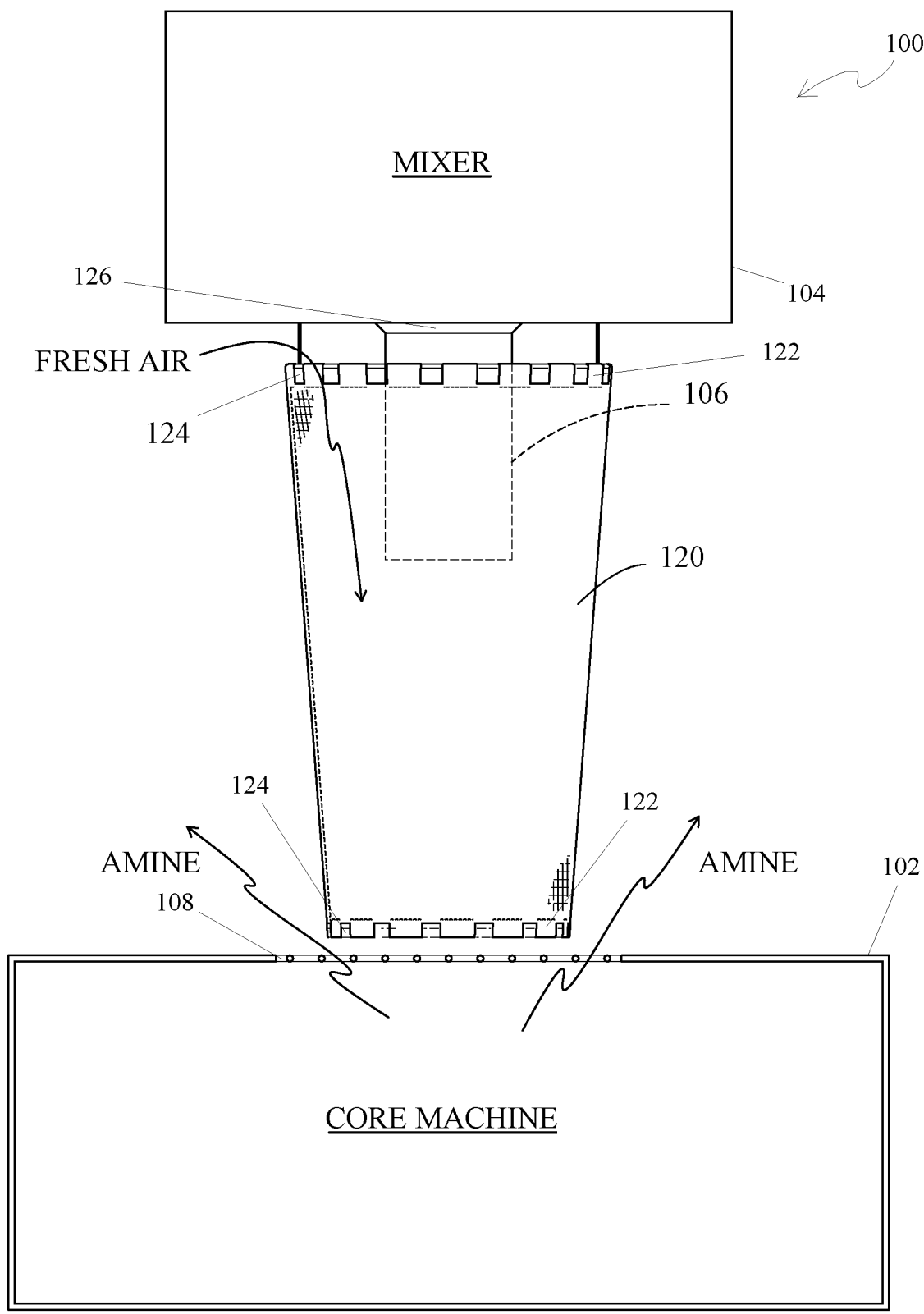
FIG. 1 is a schematic depiction of an embodiment of a flexible chute as disclosed in co-pending design application 29/611,416.

FIG. 1 is a schematic depiction, taken from co-pending design patent application 29/611,416, of a system 100 for preparing a foundry molding mix and dispensing the foundry molding mix as a workable foundry molding mix into a core machine 102, where the workable foundry molding mix is formed and shaped into shapes useful for metal casting. The preparation of the foundry molding mix occurs in a mixer 104, in which an aggregate is mixed with components of a binder system. In this known step from the prior art, the aggregate is coated with the binder system components. The physical contact of the binder system components begins known chemical reactions to form a polyurethane binder which, when coating the aggregate, provides a foundry molding mix having a limited but useful working time.

A mixer chute 106 is attached to a lower surface of the mixer 104 by means of an attachment rim 126. Appropriate gating (not shown) associated at the point of attachment allows the workable foundry molding mix to selectively flow by gravity through the chute 106 into a grate 108 of the core machine 102. In the core machine 102, conventional processes and equipment are used to form the workable foundry molding mix into shapes that are useful in metal casting. In one process, the so-called polyurethane cold box process, a curing gas comprising gaseous tertiary amine, optionally diluted in a carrier gas, is blown through the shapes, resulting in a hardened shape. Inevitably, some of the curing gas escapes from the core machine through grate 108. If the curing gas encounters the workable foundry molding mix outside of the core machine, the workable foundry molding mix can harden, creating the clean-up problem as known in the prior art.

As shown in FIG. 1, a solution to the premature curing was realized by placing a flexible chute 120 to surround and encompass the mixer chute 106. From observation, it is believed that the presence of the flexible chute 120 introduces a downward flow of fresh air around the workable foundry molding mix that is falling into the core machine 102, shielding the mix from fugitive amine from the core machine. In the embodiment from the design application, the flexible chute 120 is a conical tube that tapers from top to bottom. Preferably, the tube 120 has a circular top and a circular base. To provide the flexibility, the chute is preferably constructed of a woven material that can have seams that are sewn, formed by thermal means and the like. Further, the woven material may comprise polymeric fibers and/or may be coated with a polymeric continuous phase so that the woven material operates as a reinforcement. A series of loops 122 at the top and base can each receive a hoop 124 that holds an interior of the flexible chute 120 open.

The flexible chute 120 was recognized as providing advantages not seen in the prior art, including the ease with which it could be more easily removed for cleaning or replaced.

When such advantages were recognized, interest was created to provide further protection to the mixer chute 106. With that in mind, designs such as the lining socks 230 and 330 of FIGS. 2 and 3 were generated.

Figure 2:
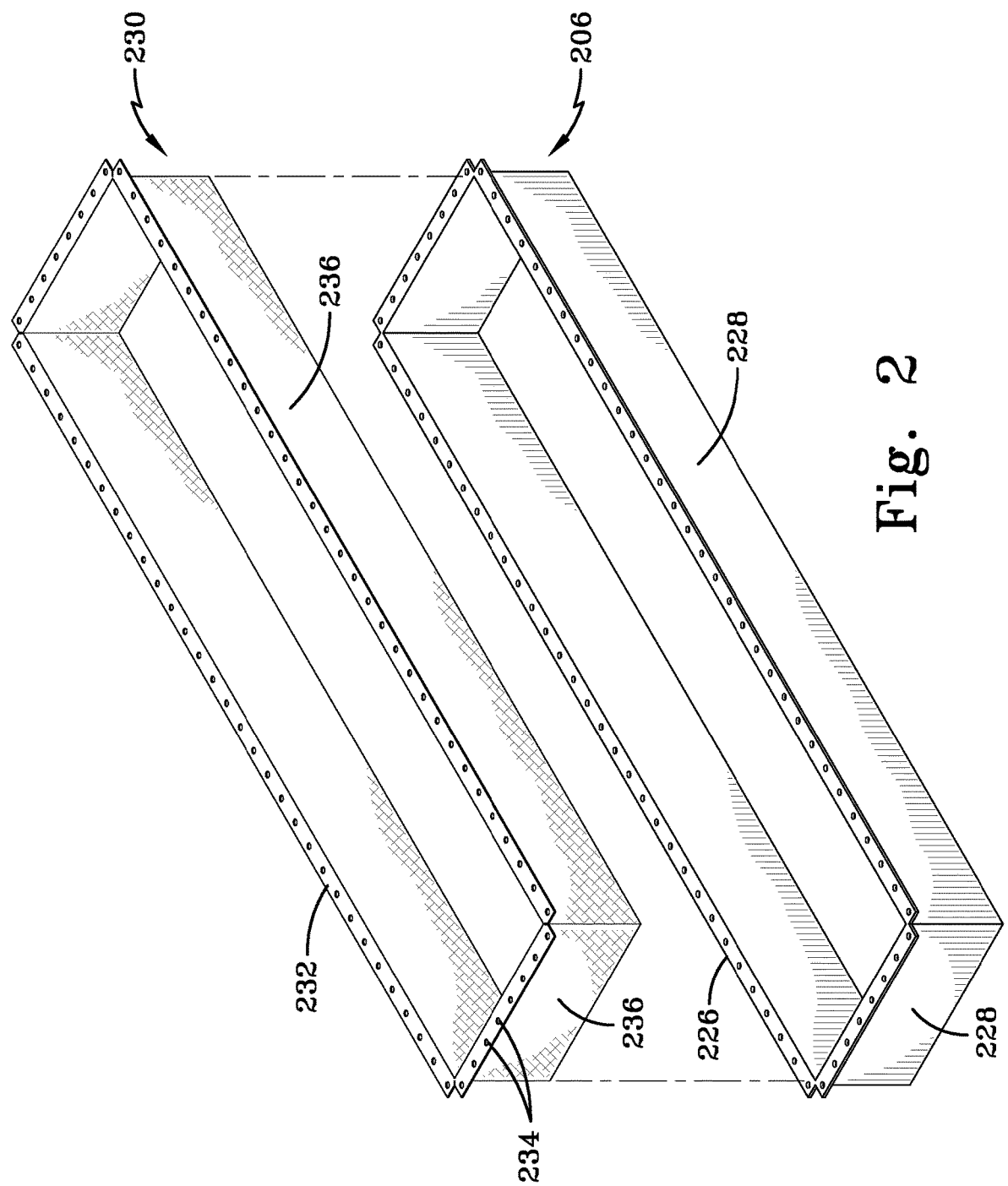
FIG. 2 is an exploded perspective view of an embodiment of a lining sock as used in a commercial trough design.

FIG. 2 is an exploded perspective view of a first embodiment 206 of a mixer chute, as is known in the art. This particular embodiment 206 of the chute is most generally characterized as being of metallic construction, with an attachment rim 226, depicted here as an outwardly-extending flange with a plurality of holes for receiving fasteners used to fasten the chute to a mixer of the type depicted in FIG. 1. The mixer chute 206 is a trough-like chute of a rectangular profile with four side walls 228.

An internal lining sock 230 embodying the inventive concept is also shown in FIG. 2, aligned for removable insertion into the mixer chute 206. The lining sock 230 has an upper body portion 232 that is characterized by an attachment rim with a plurality of apertures that are arranged to allow passage of fasteners used to attach the chute 206 to a mixer, in the manner depicted in FIG. 1. In such a situation, the upper body portion 232 would be interposed between the mixer chute 206 and the mixer. In many of the embodiments, the upper body portion 232 will comprise a flexible material, as this is useful in cleaning adhered foundry molding mix from the lining sock 230. Because of stresses imposed on the apertures, it is preferred to provide a reinforcing means to these apertures, typically by a grommet 234, although the apertures may be reinforced by stitching that simulates the reinforcement of button holes. When at least two different weights of flexible material are available for the upper body portion 232, it would be preferred to use the heavier weight material. In some applications, the upper body portion 232 may comprise a rigid material, such as a plurality of strips of sheet metal.

Attached to the upper body portion 232, and depending downwardly therefrom with an arrangement that conforms to an interior profile of the mixer chute 206, is a plurality of body panels 236 that are joined together to define a lower body portion. Depending on the size and overall weight of this lower body portion, it may be preferred to utilize the lighter-weight flexible material when the heavier-weight material is used for the upper body portion. Preferred characteristics of the flexible material are described below.

Figure 3:
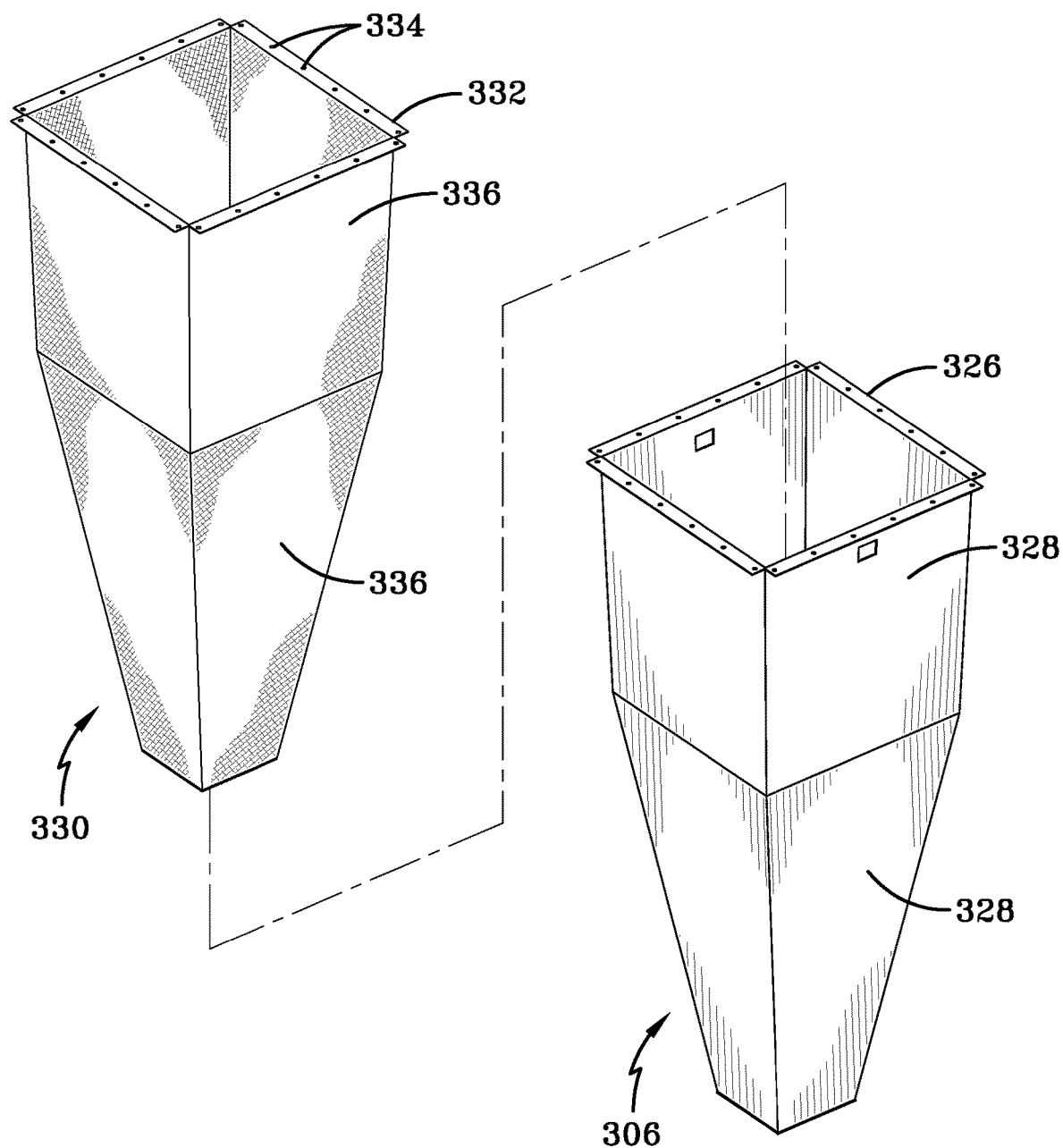
FIG. 3 is an exploded perspective view of an embodiment of a lining sock as used in a commercial mixer chute.

FIG. 3 is an exploded perspective view of a second embodiment 306 of a mixer chute, as is known in the art. This particular embodiment 306 of the chute is most generally characterized as being of metallic construction, with an attachment rim 326, depicted here as an outwardly-extending flange with a plurality of holes for receiving fasteners used to fasten the chute to a mixer of the type depicted in FIG. 1. The mixer chute 306 is a funnel-like chute of a rectangular profile with side walls 328.

An internal lining sock 330 embodying the inventive concept is also shown in FIG. 3, aligned for removable insertion into the mixer chute 306. The lining sock 330 has an upper body portion 332 that is characterized by an attachment rim with a plurality of apertures that are arranged to allow passage of fasteners used to attach the chute 306 to a mixer, in the manner depicted in FIG. 1. In such a situation, the upper body portion 332 would be interposed between the mixer chute 306 and the mixer. In many of the embodiments, the upper body portion 332 will comprise a flexible material, as this is useful in cleaning adhered foundry molding mix from the lining sock 330. Because of stresses imposed on the apertures, it is preferred to provide a reinforcing means to these apertures, typically by a grommet 334, although the apertures may be reinforced by stitching that simulates the reinforcement of button holes. When at least two different weights of flexible material are available for the upper body portion 332, it would be preferred to use the heavier weight material. In some applications, the upper body portion 332 may comprise a rigid material, such as a plurality of strips of sheet metal.

Attached to the upper body portion 332, and depending downwardly therefrom with an arrangement that conforms to an interior profile of the mixer chute 306, is a plurality of body panels 336 that are joined together to define a lower body portion. Depending on the size and overall weight of this lower body portion, it may be preferred to utilize the lighter-weight flexible material when the heavier-weight material is used for the upper body portion. Preferred characteristics of the flexible material are described below.

In all of the embodiments of the lining sock, it may be preferred to have the flexible material that comprises the lower body portion to extend a short distance beyond a lower edge of the chute with which it is used, as this allows the lining sock to be grasped and shaken to loosen adhered foundry molding mix. Such an extension also allows, in some situations, the attachment of a weighting ring or the like to hold the flexible material into close association with the interior surface of the chute.

Two commercially-available polymer-coated fabrics have been identified as being useful for this application. A first of these fabrics is a lighter-weight material and the second material is a heavier-weight material. In a specific application, it is desirable to use the lighter-weight material to the fullest extent possible and to use the heavier-weight material in portions of the liner sock that will experience greater stress and/or wear. For example, the areas where grommets are installed would preferably have the heavier-weight material.

A preferred lighter-weight material has a high-density polyethylene woven fabric base completed with a low-density polyethylene coating. The nominal weight of the base fabric is 5.6 oz/yd$^2$, with 14 tapes per inch in both the warp and weft directions. When coated, the fabric has an overall thickness of 12 mils, with 2 mils on each side being coating. The coated material has a tensile grab strength of 155 lbs in the warp direction and 170 lbs in the weft direction. Tear strength is 30 lbs in the warp and 25 lbs in the weft. The coated material is treated for both UV resistance and flame resistance.

A preferred heavier-weight material is a polyester woven fabric, coated with PVC. The base fabric has a nominal weight of 18.5 oz/yd². The coated material has a tensile strength of 470 lbs in the warp and 485 lbs in the weft. The respective tear strengths are 90 and 70 lbs. The coated material is treated for both UV resistance and flame resistance.

Although two embodiments of a liner for protecting an interior surface of a chute for transferring workable foundry molding mix from a mixer to a machine for molding and hardening the workable foundry molding mix are presented in the foregoing descriptive materials, the scope of the invention is not limited to these embodiments, but is instead to be measured in accord with the patent claims.

What is claimed is:

1. In a machine for molding and hardening a workable foundry molding mix, an improved chute for transferring the workable foundry molding mix from a mixer into the machine for molding and hardening, the improvement comprising:
   a liner for the chute, the liner having an upper border portion, sized and adapted for securing the liner to an upper portion of the chute; and a body portion, having at least one panel of a flexible material, the body portion sized and adapted to line the interior surface of the chute.

2. The improved chute of claim 1, wherein:
   the upper border portion has at least one panel of a flexible material.

3. The improved chute of claim 2, further comprising:
   means for attaching the upper border portion to the upper portion of the chute, deployed on the upper border portion.

4. The improved chute of claim 3, wherein:
   the means for attaching comprises a plurality of apertures through the upper border portion, each of the apertures positioned for passage therethrough by one of a plurality of fasteners that attaches the chute to the mixer.

5. The improved chute of claim 4, further comprising:
   a plurality of reinforcing grommets, with each of the plurality of apertures provided with one of the reinforcing grommets.

6. The improved chute of claim 2, wherein:
   the flexible material of the upper border portion is a woven fabric comprising polymeric fibers.

7. The improved chute of claim 6, wherein:
   the flexible material of the upper border portion further comprises a polymeric coating.

8. The improved chute of claim 1, further comprising:
   means for attaching the upper border portion to the upper portion of the chute, deployed along the upper border portion.

9. The improved chute of claim 8, wherein:
   the means for attaching comprises a plurality of apertures through the upper border portion, each of the apertures positioned for passage therethrough by one of a plurality of fasteners that attaches the chute to the mixer.

10. The improved chute of claim 9, wherein:
    the flexible material of the body portion is a woven fabric comprising polymeric fibers.

11. The improved chute of claim 10, wherein:
    the flexible material of the body portion further comprises a polymeric coating.

* * * * *